Patented May 8, 1951

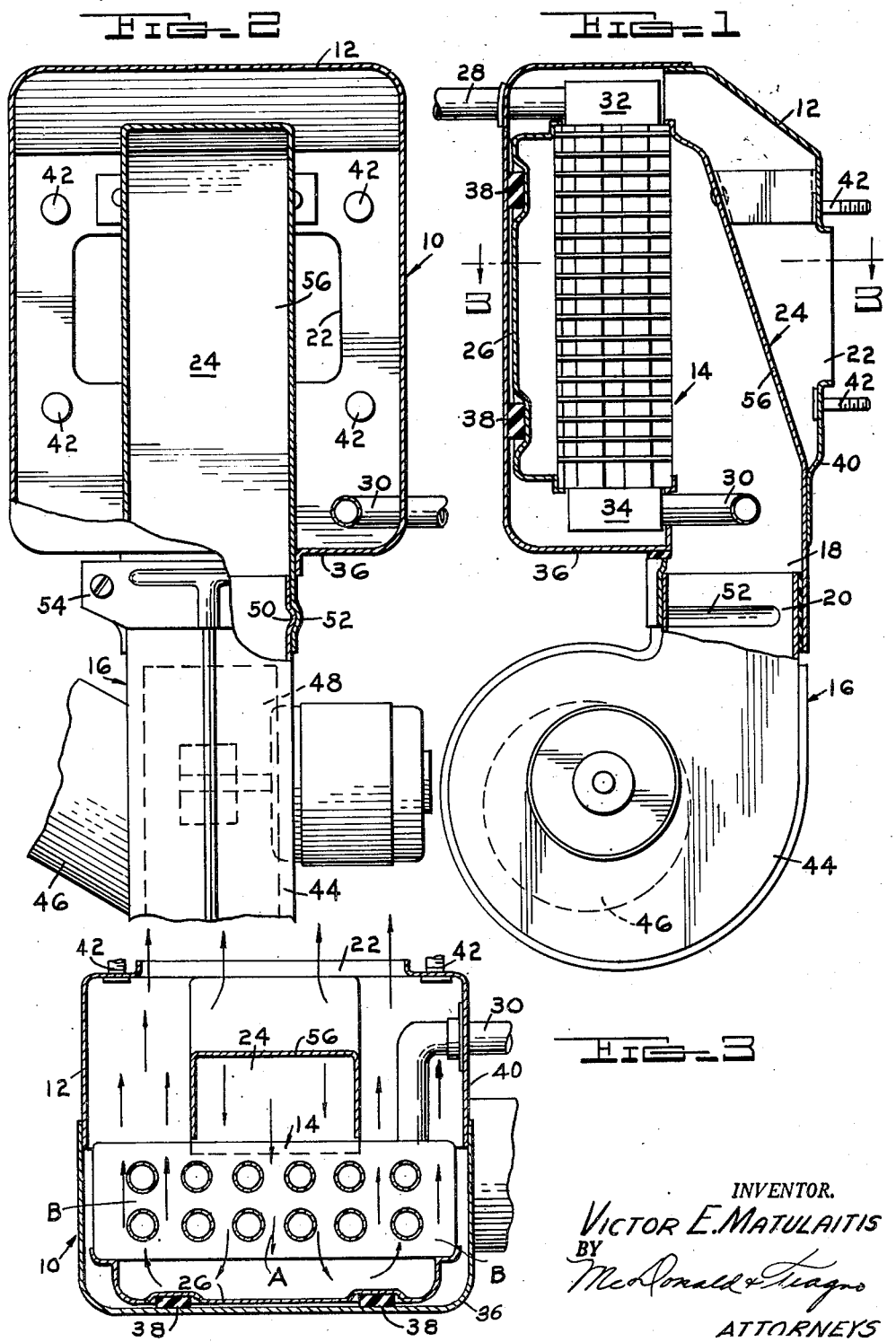

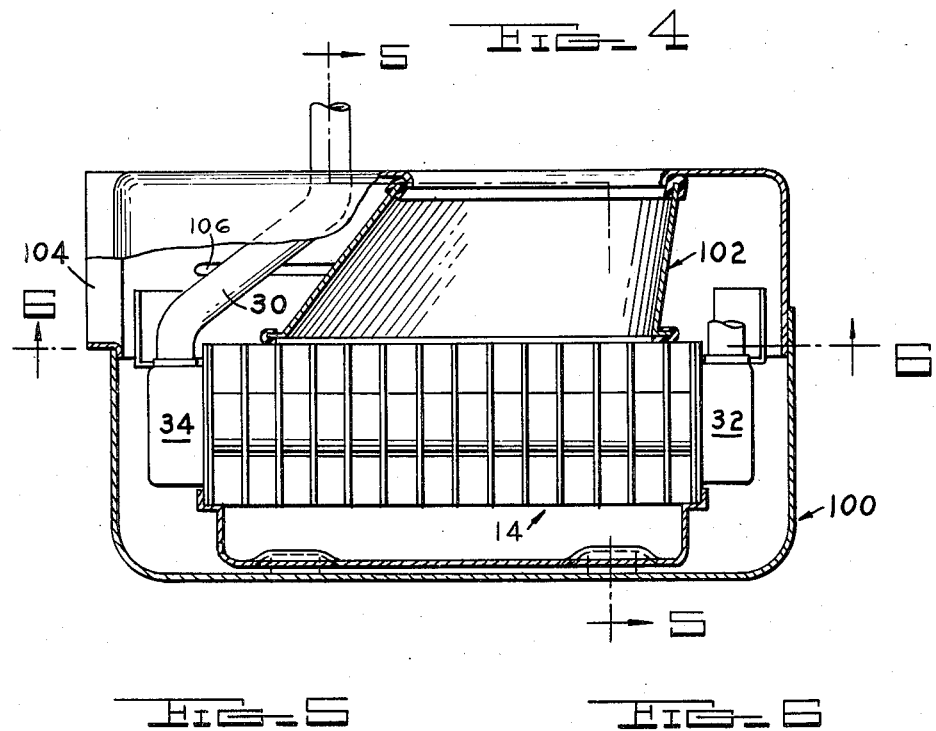
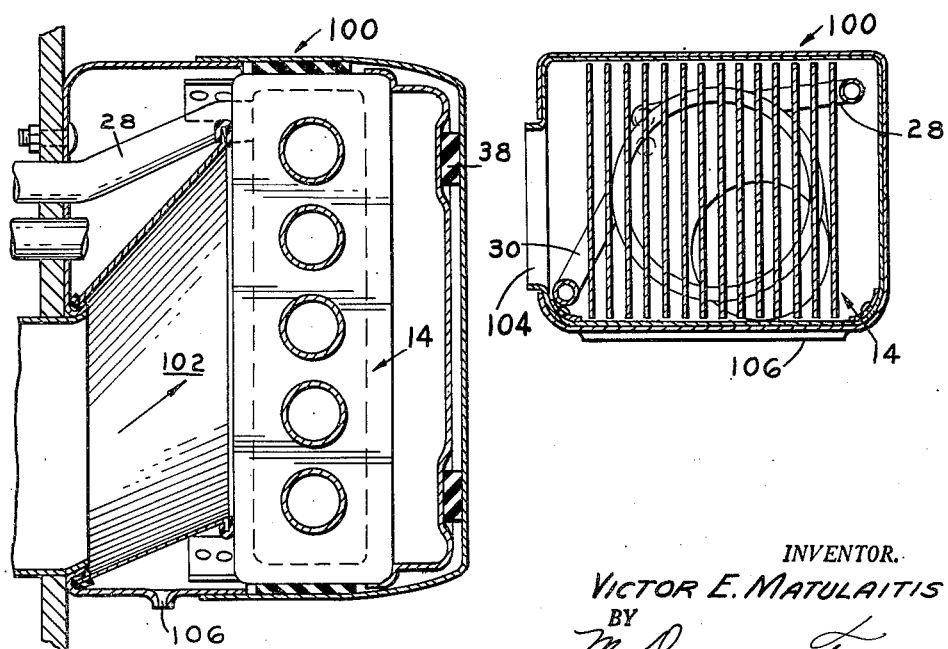

2,552,337

UNITED STATES PATENT OFFICE 2,552,337

HEATER

Victor E. Matulaitis, Detroit, Mich., assignor to Eaton Manufacturing Company, Cleveland, Ohio, a corporation of Ohio Application October 2, 1947, Serial No. 777,507

3 Claims. (Cl. 257—137)

1

This invention relates to heaters and more particularly to space heaters for automotive vehicles.

Broadly the invention comprehends the provision of a space heater for automotive vehicles and the like wherein the air delivered to the heater for distribution therefrom as heated air is double passed through the heater core thereof, that is the air is first passed through one section of the core, and raised in temperature and then it is baffled back through another section of the core to be further raised in temperature.

Although the development of space heaters for automotive vehicles has extended over a great number of years none has utilized the principle herein devised of double heating the air passed through the heater core in its continuous enclosed path of flow from entry to and exit from the heater wherein the air passage area throughout the heater and at its exit is at least equivalent to the air entrance area.

An object of the invention is the provision of an automotive vehicle space heater having means providing for the flow of inlet air through the heater core first through one section thereof and thence through a second section in a continuous path of flow so as to effectively raise the temperature of the air passed therethrough.

Another object of the invention is the provision of a space heater for automotive vehicles of the fresh air type providing means for effectively raising the temperature of the inlet air by double heating the air passed through the heater.

A further object of the invention is the provision of a heater for automotive vehicles wherein a dual pass heating arrangement is provided with the first pass being arranged substantially centrally of the second pass thereby eliminating cold radiation.

Other objects and advantages of the invention will appear from the following description taken in connection with the drawings, forming a part of the specification; and in which:

Fig. 1 is a partially cross sectionalized side plan view of a heater;

Fig. 2 is a partially cross sectionalized front plan view of the heater shown by Fig. 1;

Fig. 3 is a cross sectional view taken substantially along line 3—3, Fig. 1;

Fig. 4 is a partially cross sectionalized top plan view of a modified form of heater;

Fig. 5 is a cross sectional view taken substantially along line 5—5, Fig. 4, and;

Fig. 6 is a cross sectional view taken substantially along line 6—6, Fig. 4.

2

The present invention was devised primarily for the purpose of providing a fresh air space heater for automotive vehicles or the like capable of effectively raising the temperature of the air passed therethrough without necessity of increasing the heater element or core size of the heater. This is accomplished by an effective arrangement of ducting whereby the air delivered to the heater is initially passed through a portion of the heater element or core and after its first heat rise is baffled and routed to another portion of the heater core for passage therethrough for a further heat rise thereof.

The heater ducting is arranged preferably so that the intake air will pass substantially centrally of the second stage heating of the air and in this way will derive heat from the second stage as well as eliminate any cold radiation on the exterior surface of the heater.

The air passage paths through the heater core in the double passing of the air therethrough are so constructed as to permit of the flow of air from the entry of the heater proper to the exit thereof without any appreciable velocity change and thereby assume the delivery of as ample a supply of heated air as required for efficient heating of the passenger compartment of the vehicle with which the heater is associated.

Referring to Figs. 1 through 3 for more specific details of the invention 10 represents generally a fresh air heater adapted for use in the heating of the passenger compartment of automotive vehicles or the like comprising a housing or case 12, incorporating a hot water heater core 14, thereon and having a blower unit 16 associated therewith in communication at the air inlet thereto.

The heater housing 12 having the heater core 14 therein has an air inlet opening 18 communicating with the outlet opening 20 of the blower unit 16, an air outlet or discharge opening 22 adapted to exit into the passenger compartment of a vehicle with which the heater is associated or a suitable air distributing apparatus, not shown, air inlet shrouding or ducting 24 extending from the air inlet opening 18 to a central portion of heater core 14 and an air baffle or shroud member 26 for effecting movement of the air after passage from the shrouding 24 through a central portion of the core, through that portion of the core situated in surrounding adjacent relation to the central portion of the core to the air discharge opening 22.

The heater core 14 is of conventional hot water construction and includes appropriate water inlet and outlet conduits 28 and 30 respectively and associated header members 32 and 34 respectively.

The core is so supported relative to the housing and shrouding 24 and baffle cover or shroud member 26 so as to be in the direct path of flow of air passing through shrouding 24 in the initial pass or heat rise stage of the air and the second pass or heat rise stage of the air after being directed by the baffle member 26 from zone A of the heater core through zones B thereof. Zone A is not shrouded or separated from zone B by any means and exists only because of the arrangement of the shrouding 24 and baffle 26 and the normal path of flow of air delivered to the heater from the blower unit 16.

The arrows shown by Fig. 3 of the drawings designate the direction and course of flow of the air in its passage through the heater from the shrouding 24 through to the discharge opening 22.

The baffle 26 of the heater is supported and spaced from one section 36 of the heater housing by bumper members 38 made of rubber or similar suitable material for holding the baffle cover firmly relative to the heater core.

The housing in addition to section 36 includes a section 40 which is fitted relative to housing section 36 to form a complete shrouding of the heater air passages and especially the air passage after the second pass thereof through heater core zone B and has discharge opening 22 thereon.

The heater 10 is of the type adapted to be mounted under the hood of the vehicle engine on the fire wall thereof and is provided with suitable members 42 for supporting the heater upon the fire wall of the vehicle.

The blower unit 16 comprises a blower housing 44, having an inlet conduit 46 adapted to be connected to a fresh air inlet duct, not shown, and discharge opening 20, and an electric motor driven blower member 48 supported upon and operable within the housing 44.

The housing 44 is provided with a pair of external ribs 50 on the open end 20 thereof adapted to cooperate with ribs 52 on the heater housing for sliding engagement therewith permitting of ease in the assembling of the blower housing upon the heater housing. A holding strap 54 suitably bolted to the housing is provided for holding the housings together when in assembled position.

In viewing Figs. 2 and 3 of the drawings it is to be noted that the shrouding 24 is in the form of a rectangular channel arranged centrally relative to the heater core having an angular wall section 56 providing for the free flow of air delivered thereto across the face of the heater core with which it is associated for heat transfer passage through the core zone A.

The baffle cover 26 is so arranged relative to the heater core as to permit free flow of the air through the core to be directed therein for subsequent delivery to zone B of core without causing any back pressure in the flow passage of the air through the heater from the entry to exit thereof.

With reference to Figs. 4, 5, and 6 of the drawings a slight modification of the structure shown by Figs. 1, 2, and 3 is illustrated wherein a heater 100 is provided adapted to be mounted as shown by Fig. 5 on the fire wall of the vehicle with which it is associated within the passenger compartment and incorporating instead of the rectangular nature of shrouding 24 provided by the heater of Figs. 1 through 3 a shrouding or ducting 102 in the form of a cone is provided, said ducting being arranged for association with the central section of the heater core similarly to shrouding 24.

The air outlet opening 104 of the heater 100 is arranged differently from that of heater 10 in that because of its arrangement inside the passenger compartment it is adapted to be associated with an air distributor, not shown, arranged at one side thereof. In addition to the air outlet 104 another outlet opening 106 is provided at the bottom of the heater for air distribution toward the floor of the vehicle.

The heater 100 likewise as 10 is so constructed that no cold radiation will occur because of the arrangement of the inlet air ducting centrally of the heater and the path of heated air after its passage through the second pass or heat rise stage. The blower of heater 100 can be suitably located wherever convenient relative to vehicle design or the like.

Both heaters 10 and 100 are so constructed that in the operational flow of air therethrough there will be no velocity changes and especially so with regards to the relative areas of the air inlet to the air outlets thereof wherein the air outlet is made greater than the area of the air inlet thereby eliminating any possibility of re-acceleration of the air flow.

Although the drawings are directed to the application of the principle of two pass air heating to fresh air heaters it is clearly conceivable that it is equally adaptable to recirculating heaters with the advantage that smaller heater cores could be provided for a like heat rise of conventional types of recirculating heaters.

While this invention has been described in connection with certain specific embodiments, the principle involved is susceptible of numerous other applications that will readily occur to persons skilled in the art. The invention, therefore is limited only as indicated by the scope of the appended claims.

What I claim is:

1. A vehicle heater comprising a casing having an air inlet opening and an air outlet opening, a heat exchange unit disposed in the casing with its face portions in parallel arrangement to the outlet opening, a tapering passage channel member extending from the inlet opening to a central section of the heat exhange unit in substantially sealing engagement upon a face of the heat exchange unit adapted to direct air from the air inlet opening through the central section of the core in a direction away from the air outlet opening, and a baffle cover member arranged over the entire face of the heat exhange unit oppositely disposed from the channel member and forming therewith an air chamber for directing the air passed through the central section of the heat exchange unit in an opposite direction through the other sections of the heat exchange unit on outside opposite sides of the central section of the heat exchange unit.

2. A vehicle heater comprising a casing having an air inlet opening and air outlet opening, a heat exhange unit disposed in the casing with its face portion in parallel arrangement to the outlet opening, a tapering passage channel member extending from communication with the inlet opening in its entirety to a central section of the heat exchange unit in substantially sealing engagement upon a face of the heat exchange unit adapted to direct air from the air inlet opening through the central section of the core in a direction away from the air outlet opening, said channel member including a pair of parallel walls and a connecting plate between the walls extending angularly to the heat exchange unit from a point spaced from the face of the unit at the air inlet opening to contact relation on the face of the unit disposed from the air inlet opening for the uniform distribution of air to the unit delivered through the channel, a baffle cover member arranged over the face of the heat exchange unit oppositely disposed from the channel member, and forming therewith an air chamber for directing the air passed through the central section of the heat exchange unit in an opposite direction through the other section of the heat exchange unit and an air blower unit associated with the air inlet opening for delivering air thereto.

3. A vehicle heater comprising a casing having an air inlet opening and an outlet opening, a heater core disposed in the casing, a tapering passage channel member within the casing extending from the air inlet opening to a section of a face of the heater core having a pair of parallel walls and an angular roof joining the walls extending from full spaced relation from the unit at its end associated with the air inlet opening to substantially contacting relation on the face of the unit at its other end disposed away from the air inlet opening for uniformly distributing air delivered to the inlet opening across the face of the heater core with which it is situated and a shallow pan member within the casing arranged across the full face of the heater core, oppositely disposed from the channel member, providing an air chamber therewith for receiving the air delivered thereto through the core from the air inlet opening and for distributing said air through the other sections of the core, said channel member and pan member cooperating to support the core in the casing.

VICTOR E. MATULAITIS.

REFERENCES CITED

The following references are of record in the file of this patent:

FOREIGN PATENTS

| Number | Country | Date |
| --- | --- | --- |
| 1,448,325 | Alexander | Mar. 13, 1923 |
| 1,502,858 | Little, Jr. | July 29, 1924 |
| 1,853,333 | Bates | Apr. 12, 1932 |
| 1,881,776 | MacLeod | Oct. 11, 1932 |
| 1,892,307 | Jordan | Dec. 27, 1932 |
| 1,909,144 | Bates | May 16, 1933 |
| 1,966,632 | Larkin | July 17, 1934 |
| 2,213,016 | Perkins | Aug. 27, 1940 |